United States Patent
Curry et al.

(10) Patent No.: US 10,959,521 B2
(45) Date of Patent: Mar. 30, 2021

(54) CORNER REINFORCEMENT GUSSET

(71) Applicant: Snap-on Incorporated, Kenosha, WI (US)

(72) Inventors: David Curry, Kenosha, WI (US); William T. Sharp, Pleasant Prairie, WI (US); Todd Stevenson, Kenosha, WI (US); Daniel Eggert, Kenosha, WI (US); David Doerflinger, Racine, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 15/784,953

(22) Filed: Oct. 16, 2017

(65) Prior Publication Data

US 2018/0317654 A1 Nov. 8, 2018

Related U.S. Application Data

(60) Provisional application No. 62/503,128, filed on May 8, 2017.

(51) Int. Cl.
| | | |
|---|---|---|
| *A47B 95/00* | (2006.01) | |
| *F16B 12/50* | (2006.01) | |
| *B23K 26/38* | (2014.01) | |
| *F16B 12/44* | (2006.01) | |

(52) U.S. Cl.
CPC .............. *A47B 95/00* (2013.01); *B23K 26/38* (2013.01); *F16B 12/44* (2013.01); *F16B 12/50* (2013.01)

(58) Field of Classification Search
USPC ........................................................ 403/402
See application file for complete search history.

(56) References Cited

U.S. PATENT DOCUMENTS

| | | | |
|---|---|---|---|
| 1,959,148 A | 5/1934 | Axe | |
| 2,004,727 A | 6/1935 | Keller | |
| 2,081,722 A | 5/1937 | Weinzierl | |
| 3,275,356 A | 9/1966 | Heywood | |
| 3,472,543 A * | 10/1969 | Biro | E06B 3/9681 |
| | | | 160/381 |
| 3,604,739 A | 12/1971 | Carlisle | |
| 3,899,258 A | 8/1975 | Matthews | |
| 4,024,691 A | 5/1977 | Hansen et al. | |

(Continued)

FOREIGN PATENT DOCUMENTS

| | | |
|---|---|---|
| BE | 903425 | 2/1986 |
| CA | 1057581 | 7/1979 |

(Continued)

OTHER PUBLICATIONS

Internet Archive, ASTM A572 Grade 50 Plate, https://web.archive.org/web/20071205235420/https://www.speedymetals.com/information/Material61.html captured Dec. 5, 2007. (Year: 2007).*

(Continued)

*Primary Examiner* — Adam Krupicka
(74) *Attorney, Agent, or Firm* — Seyfarth Shaw LLP

(57) ABSTRACT

A corner reinforcement gusset with a radial or other shaped cutout at an internal corner of the gusset. The cutout can alleviate the stresses at that corner and reduce failure. The gusset can therefore better reinforce an enclosure or other object to maintain the structural stability of the object better than prior art gussets.

18 Claims, 6 Drawing Sheets

(56) References Cited

U.S. PATENT DOCUMENTS

| | | | |
|---|---|---|---|
| 4,192,624 A | | 3/1980 | Bucci |
| 4,238,909 A | | 12/1980 | Mutton |
| 4,538,936 A | | 9/1985 | Zeidl |
| 4,541,598 A | * | 9/1985 | Villanueva ............... G09F 3/204 |
| | | | 248/222.12 |
| 4,676,686 A | | 6/1987 | Eisenloffel |
| 4,976,450 A | * | 12/1990 | Ellefson .................... A47F 5/05 |
| | | | 108/103 |
| 2006/0005488 A1 | * | 1/2006 | Wambaugh ............. E04F 13/06 |
| | | | 52/261 |
| 2019/0178025 A1 | | 6/2019 | Kellum |

FOREIGN PATENT DOCUMENTS

| | | |
|---|---|---|
| CN | 2701954 | 5/2005 |
| CN | 103975492 | 8/2014 |
| CN | 204646009 | 9/2016 |
| CN | 209413681 U | 9/2019 |
| DE | 102011107060 A1 | 1/2013 |
| FR | 2514239 | 4/1983 |
| GB | 1523723 | 9/1978 |

OTHER PUBLICATIONS

United Kingdom Office Action for Application No. GB1805246.4, dated May 29, 2019, 3 pages.
Canadian Office Action for Application No. 3,001,357 dated Jan. 9, 2019, 3 pages.
Australian Examination Report No. 1 for Application No. 2018202216 dated Sep. 7, 2018, 5 pages.
UK Combined Search and Examination Report for Application No. GB1805246.4 dated Oct. 1, 2018, 6 pages.
Australian Examination Report No. 2 for Application No. 2018202216, dated Aug. 30, 2019, 3 pages.
Chinese Office Action for Application No. 201810434212.9, dated Oct. 8, 2019, 21 pages.
Canadian Office Action for Application No. 3,001,357, dated Nov. 7, 2019, 4 pages.
Taiwan Office Action for Application No. 107115404, dated Jan. 13, 2020, 10 pages.
Chinese Office Action for Application No. 201810434212.9 dated Apr. 7, 2020, 11 pages.
Australian Examination Report No. 1 for Application No. 2019280091 dated May 26, 2020, 5 pages.

* cited by examiner

CORNER REINFORCEMENT GUSSET

RELATED APPLICATIONS

The present application is a non-provisional application of, and claims the filing benefit of, provisional patent application Ser. No. 62/503,128, filed May 8, 2017, the disclosure of which is incorporated herein in its entirety.

TECHNICAL FIELD OF THE INVENTION

The present invention relates generally to reinforcement structures. More particularly, the present invention relates to a corner reinforcement gusset having a cutout or opening at an internal corner thereof.

BACKGROUND OF THE INVENTION

Cabinets and other enclosures are common structures for enclosing contents for selective retrieval. Cabinets often include drawers or swinging doors that allow a user to access the cabinet interior when needed and keep the contents enclosed when the contents are not needed. For example, a roll cab is a common cabinet used for enclosing tools, fasteners, and other hardware. Roll cabs often include wheels or other functionality that allow the cabinet to be moved by the user.

Roll cabs and other enclosures are often shaped as a cube or rectangular prism, and therefore include corners where different faces of the enclosure meet. These corners become a concentrated point for stress on the enclosure. For example, a stress applied to one face of the enclosure will be applied to another face of the enclosure where the two faces meet. The corner can therefore include three different faces meeting at the same point, providing a point of concentrated stress based on the movement or torque applied to any of the three faces.

Reinforcement gussets are known and used to reinforce enclosure corners. These gussets are typically L-shaped and are attached to a horizontal and vertical edge of the enclosure to reinforce the corner. For example, as shown in FIG. 6, existing reinforcement gussets 600 include a first portion 605 and a second portion 610 connected by a central portion 615. The gusset 600 includes an outer corner 620 and an inner corner 625. While reinforcing an enclosure, prior art gussets 600 were shown to fail most often at the inner corner 625.

SUMMARY OF THE INVENTION

The present invention broadly comprises a corner reinforcement gusset having a structure that prevents the more common failure of prior art gussets that occur at the inner corner of the gusset. The gusset can include an opening defined at the inside corner of the gusset to avoid concentrating stresses at this point. During testing of prior art gussets, failure occurred most often at this inside corner and by providing a small cutout opening at this corner, stress failure was significantly reduced.

In particular, the present invention broadly comprises a body, such as an enclosure, having horizontal and vertical front plates, and a gusset coupled to the front plates. The gusset includes first and second portions each extending from a central portion. The central portion includes opposing external and internal corners. In an embodiment, the internal corner includes a cutout portion, such that when a rotational force is applied to the first portion relative to the second portion, resultant stresses are applied and distributed to the cutout portion. At least one of the horizontal and vertical front plates includes a return flange extending therefrom, and the gusset is spaced from the return flange such that the return flange is located within the cutout portion.

Further disclosed is a gusset including a central portion having opposing external and internal corners, and first and second portions each extending from the central portion. The internal corner includes a cutout portion, such that when a rotational force is applied to the first portion relative to the second portion, resultant stresses are applied and distributed to the cutout portion.

Still further disclosed is a method for reinforcing a corner of an enclosure including cutting a structure having first and second portions each extending from a central portion, the central portion including opposing external and internal corners, wherein the internal corner includes a cutout portion such that when a rotational force is applied to the first portion relative to the second portion, resultant stresses are applied and distributed to the cutout portion. In an embodiment, the gusset includes edges that are bead blasted. The gusset can be coupled to the enclosure by respectively coupling the first and second portions to horizontal and vertical front plates, and placing the cutout portion at an intersection between the horizontal and vertical front plates.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
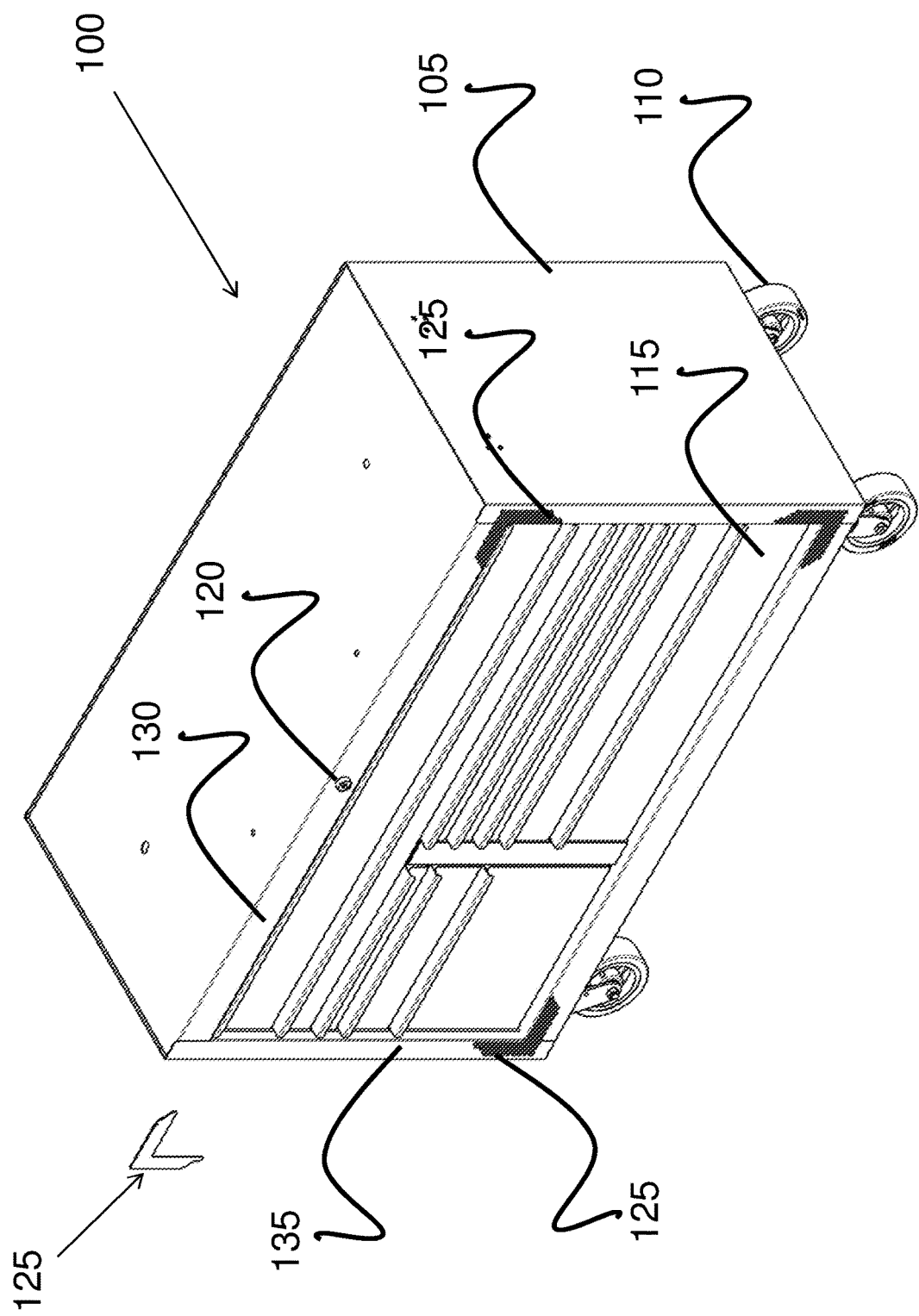
FIG. 1 is a front perspective view showing, in a disassembled state, typical placement of a reinforcement gusset, according to at least some embodiments of the present invention, with a typical enclosure, such as a cabinet.

While this invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a corner reinforcement gusset with a radial or other shaped cutout disposed at an internal corner of the gusset. The gusset can include first and second portions that couple to first and second portions of an enclosure to provide reinforcement and stress distribution to the corner of the enclosure. By providing a cutout at the internal corner, the gusset can alleviate and distribute the stress felt at that corner and reduce failure at the corner.

As shown in FIG. 1, in an embodiment, the present invention can be used with an enclosure 100, such as a roll cab or cabinet. The enclosure 100 can include a base 105 with wheels 110 that allow the enclosure 100 to be moved from one location to another. The enclosure 100 can further include drawers 115 or similar sub-enclosures, such as a swinging cabinet door that covers at least a portion of the inside of the enclosure 100. The drawers 115 can be provided on rollers to allow the drawer 115 to move into and out of the enclosure 100. The enclosure 100 can also include a lock 120 that allows the enclosure 100 to be opened only when the lock 120 is rotated to the open position by a key or through some other form of mechanical or electronic means.

A reinforcement gusset 125 can be coupled to the enclosure 100, so that the gusset 125 couples to, for example, a horizontal dress plate 130 and a vertical dress plate 135 to provide structural reinforcement to, for example, a corner of the enclosure 100. The gusset 125 can also couple to any other two or more components, other than the horizontal 130 and vertical 135 dress plate, to provide structural reinforcement to the two or more components. The gusset 125 can be coupled to the horizontal dress plate 130 and a vertical dress plate 135 in any well-known means, such as, for example, adhesive, welding, or fasteners.

As shown in FIGS. 2-5, the gusset 125 can include a first portion 140 and a second portion 145, each extending from a central portion 150. For example, the first portion 140 can couple with the horizontal dress plate 130, and the second portion 145 can couple with the vertical dress plate 135. The gusset 125 can include more than the first 140 and seconds 145 portions, for example a third and fourth or even more portions, without departing from the spirit and scope of the present invention.

Figure 2:
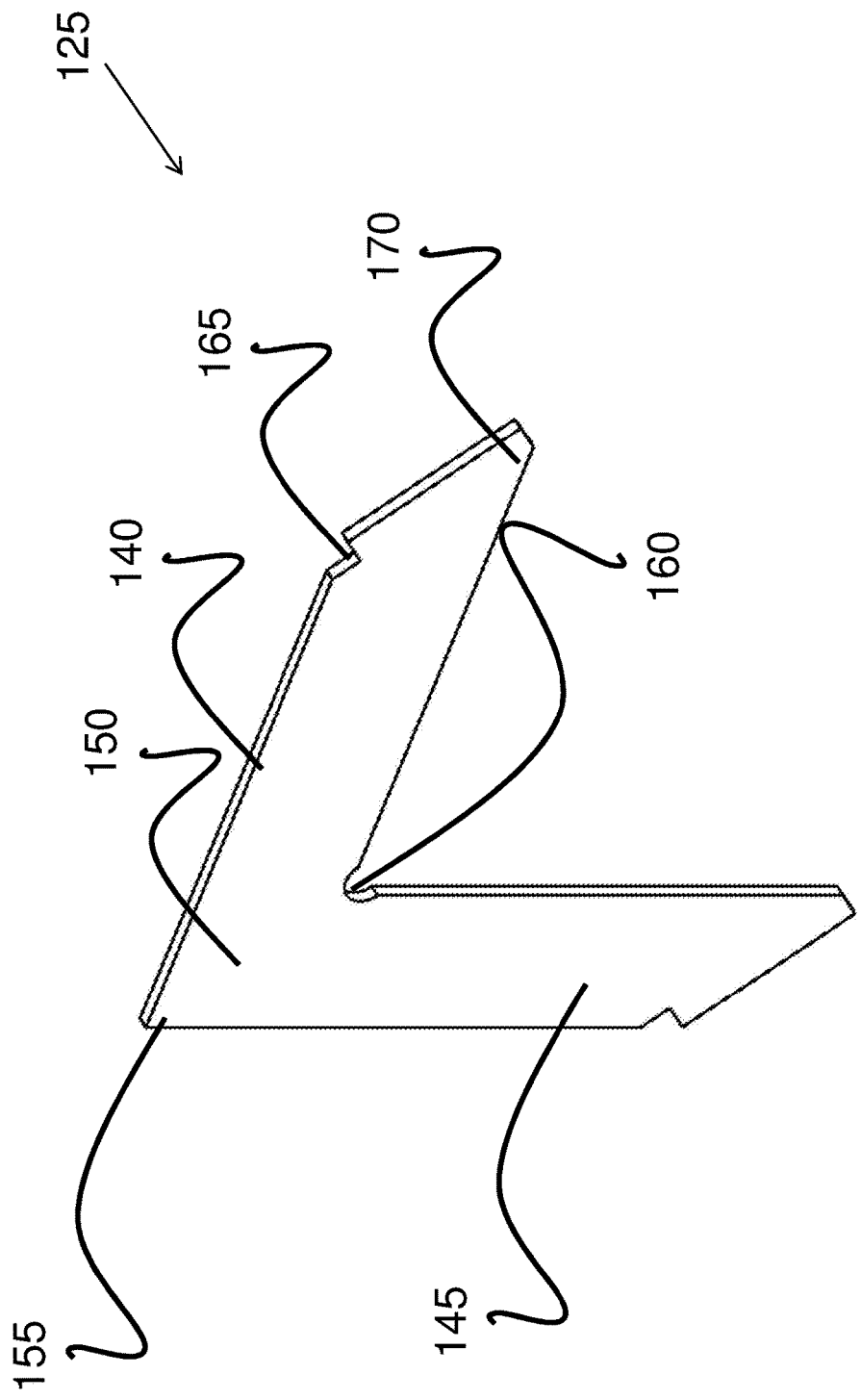
FIG. 2 is a front perspective view of a reinforcement gusset according to at least some embodiments of the present invention.
Figure 3:
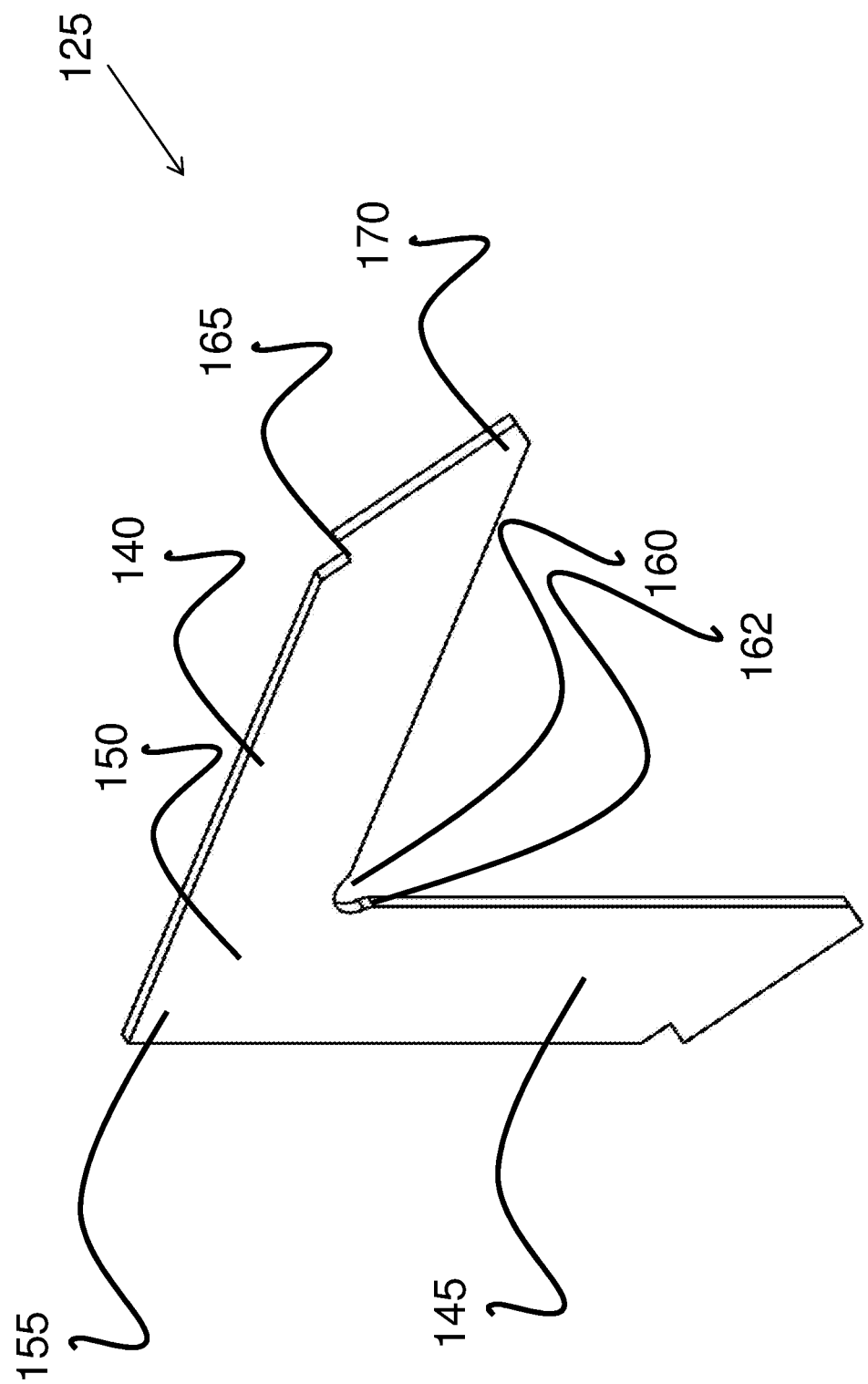
FIG. 3 is a front perspective view of another reinforcement gusset according to at least some embodiments of the present invention.

The gusset 125 can include at least opposing external 155 and internal 160 corners. For example, the external corner 155 can be located diagonally opposite the internal corner 160 as shown in, for example, FIGS. 2 and 3. The internal corner 160 can include a cutout portion, as shown, to prevent the concentration of stress on a single internal point where the first 140 and seconds 145 portions couple together. Such stresses are typically the result of typical use or movement of the enclosure. For example, in prior art gussets, the internal corner 160 is typically the first component to fail on the gusset 125. The present inventors discovered the removal of a small amount of material at the internal corner 160 to create the cutout portion would cause the stress applied at that point to be distributed more evenly over a larger area and therefore reduce the likelihood of failure. For example, as shown in FIG. 2, the cutout portion can be a radial cutout at the internal corner 160. As shown in FIG. 3, the cutout can be a combination of a radial cutout and one, two, or more chamfers or radii 162. These shapes allow the stresses to be distributed to the internal face of the radial cutout (FIG. 2) or the radial cutout with chamfers or radii 162 (FIG. 3).

The gusset 125 can also include notches 165 with points 170 in each of the first 140 and seconds 145 portions. The notches 165 can be tooling notches, for example, or can further reduce the likelihood of failure in an area near the point 170 of the gusset 125 opposite the central portion 150.

Figure 6:
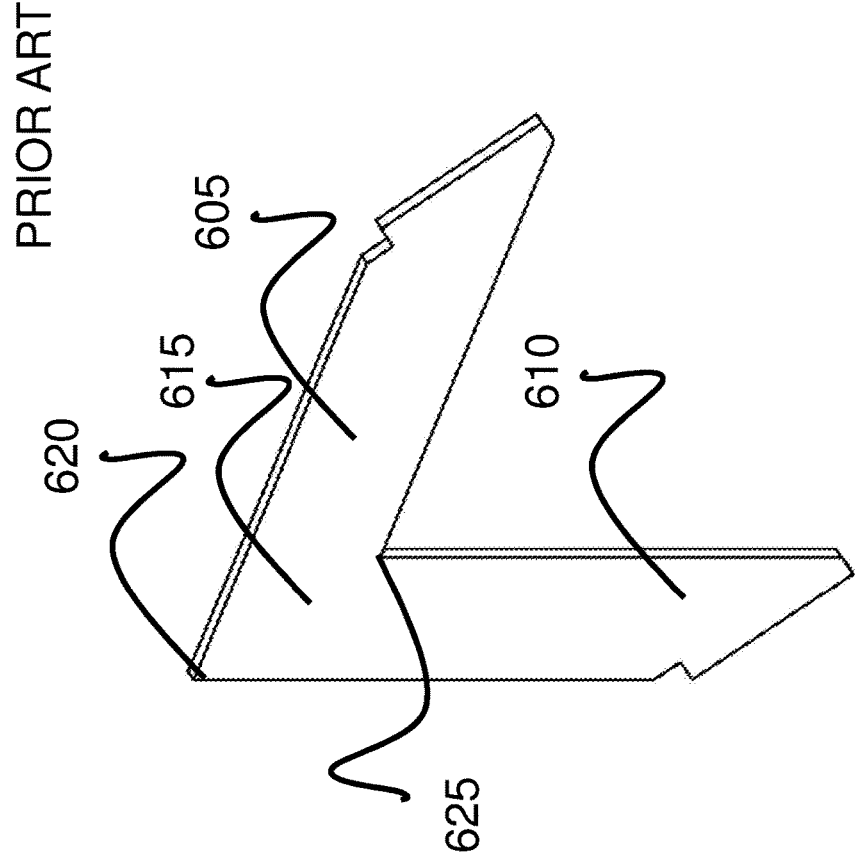
FIG. 6 is a front perspective view of a typical prior art reinforcement gusset.

The inventors of the present invention conducted extensive testing on the gusset 125 of the present invention. In doing so, the inventors obtained the following results demonstrating the gusset 125 of the present invention to be stronger, more resistant to fatigue, and tougher than prior art gussets without the radial or radial and chamfer cutout. Below are the results of the inventors' tests of the present invention. For the following tables, "Standard Profile" refers to gussets shown in FIG. 6, and "Flank Drive" refers to gussets shown in either FIG. 2 or FIG. 3.

TABLE 1

CNC Standard Profile Cold Rolled Steel

| Sample | Ultimate (in-lb) | Failure Mode |
| --- | --- | --- |
| 1 | 19083 | Inner corner sheared |
| 2 | 1795.0 | Inner corner sheared |
| 3 | 1804.0 | Inner corner sheared |
| 4 | 1756.3 | Inner corner sheared |
| 5 | 1782.9 | Inner corner sheared |
| 6 | 1793.9 | Inner corner sheared |
| 7 | 1794.8 | Inner corner sheared |
| AVG | 1805.0 | |
| STD DEV | 48.1 | |

TABLE 2

CNC Flank Drive Cold Rolled Steel

| Sample | Ultimate (in-lb) | Failure Mode |
| --- | --- | --- |
| 1 | 1993.7 | Inner corner sheared |
| 2 | 2113.1 | Inner corner sheared |
| 3 | 2143.7 | Inner corner sheared |
| 4 | 2207.5 | Inner corner sheared |
| 5 | 2254.1 | Inner corner sheared |
| 6 | 1997.9 | Inner corner sheared |
| 7 | 2106.3 | Inner corner sheared |
| AVG | 2116.6 | |
| STD DEV | 97.6 | |

TABLE 3

CNC Standard Profile HRPO Grade 50 Steel

| Sample | Ultimate (in-lb) | Failure Mode |
| --- | --- | --- |
| 1 | 2680.9 | Inner corner sheared |
| 2 | 2331.8 | Inner corner sheared |
| 3 | 2566.9 | Inner corner sheared |
| 4 | 2688.3 | Inner corner sheared |
| 5 | 2720.8 | Inner corner sheared |
| 6 | 2717.6 | Inner corner sheared |
| 7 | 2664.3 | Inner corner sheared |
| AVG | 2624.4 | |
| STD DEV | 138.9 | |

TABLE 4

CNC Flank Drive HRPO Grade 50 Steel

| Sample | Ultimate (in-lb) | Failure Mode |
| --- | --- | --- |
| 1 | 2694.4 | Inner corner sheared |
| 2 | 2709.4 | Inner corner sheared |
| 3 | 2756.0 | Inner corner sheared |
| 4 | 2621.4 | Inner corner sheared |
| 5 | 2886.8 | Inner corner sheared |
| 6 | 2892.9 | Inner corner sheared |
| 7 | 2758.2 | Inner corner sheared |
| AVG | 2759.9 | |
| STD DEV | 99.9 | |

TABLE 5

Laser Standard Profile Cold Rolled Steel

| Sample | Ultimate (in-lb) | Failure Mode |
| --- | --- | --- |
| 1 | 1955.7 | Inner corner sheared |
| 2 | 1945.9 | Inner corner sheared |
| 3 | 1871.7 | Inner corner sheared |
| 4 | 1876.0 | Inner corner sheared |
| 5 | 1889.7 | Inner corner sheared |
| 6 | 1884.7 | Inner corner sheared |
| 7 | 1869.2 | Inner corner sheared |
| AVG | 1899.0 | |
| STD DEV | 36.2 | |

TABLE 6

Laser Flank Drive Cold Rolled Steel

| Sample | Ultimate (in-lb) | Failure Mode |
| --- | --- | --- |
| 1 | 2345.6 | Inner corner sheared |
| 2 | 2245.1 | Inner corner sheared |
| 3 | 2245.0 | Inner corner sheared |
| 4 | 2500.7 | Inner corner sheared |
| 5 | 2202.0 | Inner corner sheared |
| 6 | 2226.1 | Inner corner sheared |
| 7 | 2221.9 | Inner corner sheared |
| AVG | 2283.8 | |
| STD DEV | 106.3 | |

TABLE 7

Laser Standard Profile HRPO Grade 50 Steel

| Sample | Ultimate (in-lb) | Failure Mode |
| --- | --- | --- |
| 1 | 2501.1 | Inner corner sheared |
| 2 | 2566.7 | Inner corner sheared |
| 3 | 2585.4 | Inner corner sheared |
| 4 | 2486.6 | Inner corner sheared |
| 5 | 2513.8 | Inner corner sheared |
| 6 | 2543.6 | Inner corner sheared |
| 7 | 2535.8 | Inner corner sheared |
| AVG | 2533.3 | |
| STD DEV | 35.4 | |

TABLE 8

Laser Flank Drive HRPO Grade 50 Steel

| Sample | Ultimate (in-lb) | Failure Mode |
| --- | --- | --- |
| 1 | 2476.8 | Inner corner sheared |
| 2 | 2701.5 | Inner corner sheared |
| 3 | 2469.1 | Inner corner sheared |

TABLE 8-continued

Laser Flank Drive HRPO Grade 50 Steel

| Sample | Ultimate (in-lb) | Failure Mode |
| --- | --- | --- |
| 4 | 2435.2 | Inner corner sheared |
| 5 | 2424.0 | Inner corner sheared |
| 6 | 2510.6 | Inner corner sheared |
| 7 | 2427.6 | Inner corner sheared |
| AVG | 2492.1 | |
| STD DEV | 97.5 | |

TABLE 9

CNC Standard Profile Cold Rolled Steel

| Sample | Cycles | Failure Mode |
| --- | --- | --- |
| 1 | 10452.0 | Cracked |
| 2 | 12827.0 | Cracked |
| 3 | 12203.0 | Cracked |
| 4 | 14750.0 | Cracked |
| 5 | 14411.0 | Cracked |
| 6 | 10893.0 | Cracked |
| 7 | 12710.0 | Cracked |
| AVG | 12606.6 | |
| STD DEV | 1615.1 | |

TABLE 10

CNC Standard Profile HRPO Grade 50 Steel

| Sample | Cycles | Failure Mode |
| --- | --- | --- |
| 1 | 22522.0 | Cracked |
| 2 | 17233.0 | Cracked |
| 3 | 18436.0 | Cracked |
| 4 | 15613.0 | Cracked |
| 5 | 19281.0 | Cracked |
| 6 | 16545.0 | Cracked |
| 7 | 15984.0 | Cracked |
| AVG | 17944.9 | |
| STD DEV | 2405.7 | |

TABLE 11

CNC Flank Drive HRPO Grade 50 Steel

| Sample | Cycles | Failure Mode |
| --- | --- | --- |
| 1 | 45591.0 | Cracked |
| 2 | 59419.0 | Cracked |
| 3 | 27128.0 | Cracked |
| 4 | 58778.0 | Cracked |
| 5 | 49237.0 | Cracked |
| 6 | 62111.0 | Cracked |
| 7 | 60028.0 | Cracked |
| AVG | 51756.0 | |
| STD DEV | 12480.5 | |

TABLE 12

CNC Flank Drive Cold Rolled Steel

| Sample | Cycles | Failure Mode |
| --- | --- | --- |
| 1 | 12360.0 | Cracked |
| 2 | 16756.0 | Cracked |
| 3 | 13479.0 | Cracked |
| 4 | 12982.0 | Cracked |
| 5 | 20076.0 | Cracked |
| 6 | 18847.0 | Cracked |

TABLE 12-continued

CNC Flank Drive Cold Rolled Steel

| Sample | Cycles | Failure Mode |
|---|---|---|
| 7 | 22484.0 | Cracked |
| AVG | 16712.0 | |
| STD DEV | 3926.4 | |

TABLE 13

Laser Standard Profile Cold Rolled Steel

| Sample | Cycles | Failure Mode |
|---|---|---|
| 1 | 13042.0 | Cracked |
| 2 | 9997.0 | Cracked |
| 3 | 13715.0 | Cracked |
| 4 | 13478.0 | Cracked |
| 5 | 13122.0 | Cracked |
| 6 | 10703.0 | Cracked |
| 7 | 15618.0 | Cracked |
| AVG | 12810.7 | |
| STD DEV | 1899.7 | |

TABLE 14

Laser Standard Profile HRPO Grade 50 Steel

| Sample | Cycles | Failure Mode |
|---|---|---|
| 1 | 20354.0 | Cracked |
| 2 | 17828.0 | Cracked |
| 3 | 18172.0 | Cracked |
| 4 | 9908.0 | Cracked |
| 5 | 13615.0 | Cracked |
| 6 | 16388.0 | Cracked |
| 7 | 21502.0 | Cracked |
| AVG | 16823.9 | |
| STD DEV | 3989.3 | |

TABLE 15

Laser Flank Drive Cold Rolled Steel

| Sample | Cycles | Failure Mode |
|---|---|---|
| 1 | 31636.0 | Cracked |
| 2 | 35756.0 | Cracked |
| 3 | 29326.0 | Cracked |
| 4 | 31766.0 | Cracked |
| 5 | 33848.0 | Cracked |
| 6 | 29749.0 | Cracked |
| 7 | 30933.0 | Cracked |
| AVG | 31859.1 | |
| STD DEV | 2270.3 | |

TABLE 16

Laser Flank Drive HRPO Grade 50 Steel

| Sample | Cycles | Failure Mode |
|---|---|---|
| 1 | 67637.0 | Cracked |
| 2 | 69527.0 | Cracked |
| 3 | 73437.0 | Cracked |
| 4 | 38370.0 | Cracked |
| 5 | 47646.0 | Cracked |
| 6 | 62580.0 | Cracked |
| 7 | 62663.0 | Cracked |
| AVG | 60265.7 | |
| STD DEV | 12671.3 | |

The above test results show the gusset 125 failing at various amounts of rotational forces applied (results shown in in-lb) and fatigue applied (results shown in cycles). As compared to prior art gussets, the present invention gusset 125 is substantially stronger and more resistant to failure because of the cutout at the internal corner 160 and the notches 165 near the point 170. As shown, additional measures can be implemented to improve the strength of the gusset, such as by using a high strength steel that is still capable of being welded and formed (for example, grade 50 steel or cold rolled steel). Bead blasting the edges of the gusset 125 was also shown to improve the strength thereof. Additionally, laser cutting the gusset, rather than stamping it, was also shown to reduce torque-based failure and fatigue-based failure.

The above tables demonstrate the effectiveness of the cutout portion near the internal corner 160 of the gusset 125. As shown below in summary form, the cutout portion improves both fatigue and strength characteristics of the gusset.

TABLE 17

| | Avg. ultimate strength | Avg cycle life at 60% of yield strength |
|---|---|---|
| Standard gusset profile, standard material | 1805 lbs | 12606 cycles |
| Standard gusset profile, HRPO Grade 50 material | 2624 lbs | 17945 cycles |
| Improved gusset with cutout, standard material | 2117 lbs | 16712 cycles |
| Improved gusset with cutout, HRPO Grade 50 material | 2760 lbs | 51756 cycles |

Figure 4:
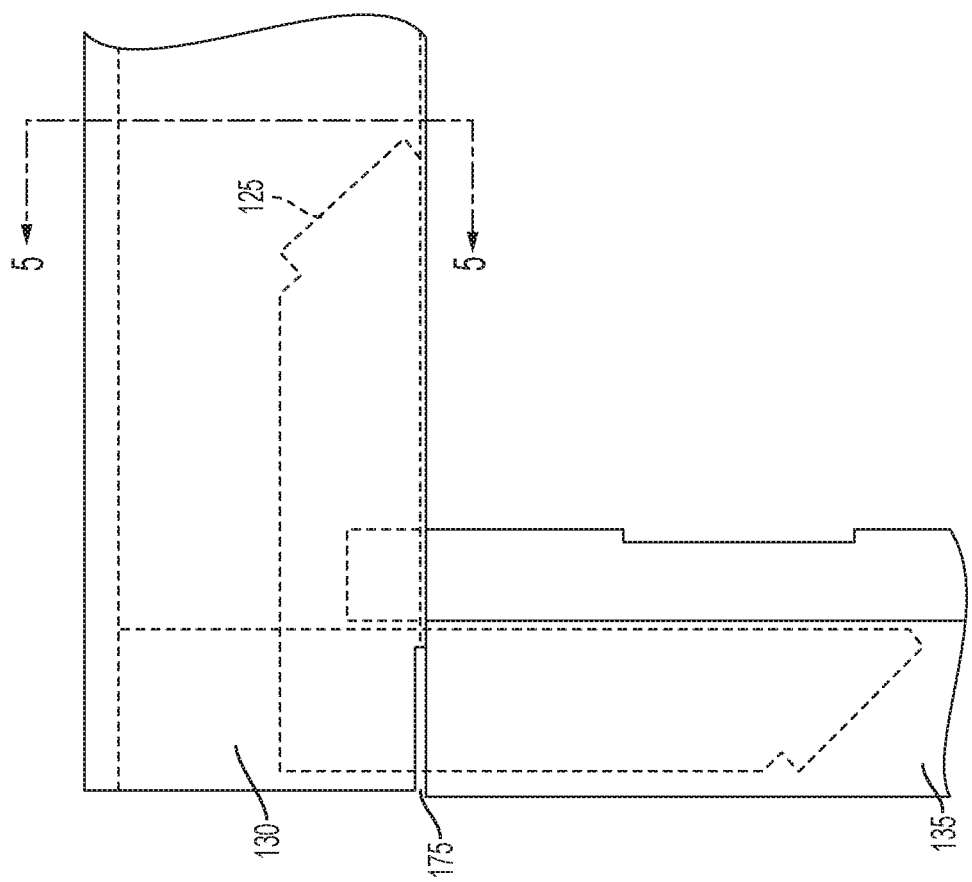
FIG. 4 is partial front view of an enclosure according to at least some embodiments of the present invention.
Figure 5:
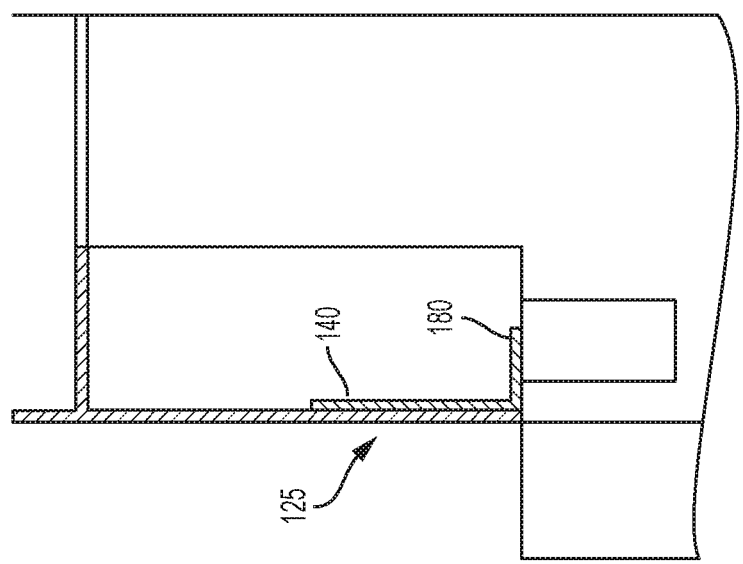
FIG. 5 is partial side sectional view of an enclosure according to at least some embodiments of the present invention.

As shown in FIGS. 4 and 5, the gusset 125 can be applied against the horizontal 130 and vertical 135 dress plates to reinforce the corner and intersection of the horizontal 130 and vertical 135 dress plates. For example, the first portion 140 can be coupled to the horizontal dress plate 130, and the second portion 145 can be coupled to the vertical dress plate 150. In some embodiments, there can be a small clearance 175 between the horizontal 130 and vertical 135 dress plates so that the horizontal 130 and vertical 135 dress plates can rotate with respect to one another without applying additional stress or torque on one another. However, consistent with the present invention, the gusset 125 can improve strength between the horizontal 130 and vertical 135 dress plates by providing a cutout at the internal corner 160. At this intersection, the horizontal 130 and vertical 135 dress plates can rotate with respect to one another and distribute the stress to the radial or radial and chamfered cutout rather than to a specific point that is more likely to cause failure.

As shown in FIGS. 4 and 5, the first portion 140 of the gusset 125 can be spaced at the internal corner 160 from a front dress plate return flange 180. This return flange 180 can cause significant stress on the internal corner 160 due to the likely movement of the flange 180 during use. The cutout at the internal corner 160 can therefore remove the likelihood of this contribution of stress and reduce the likelihood of failure at the internal corner 160.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter.

"Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A gusset for a moveable tool cabinet having horizontal and vertical front plates, wherein at least one of the horizontal and vertical front plates includes a return flange extending therefrom, the gusset comprising:
    first and second substantially flat portions extending from a central portion that includes opposing external and internal corners, the first portion is adapted to be coupled to the horizontal front plate and the second portion is adapted to be coupled to the vertical front plate, and
    a cutout portion disposed on the internal corner, wherein the cutout portion is adapted to receive stresses caused by a force applied to the first portion relative to the second portion when the tool cabinet is moved, and wherein the cutout portion is adapted to be spaced from the return flange.

2. The gusset of claim 1, wherein the cutout portion is a radial cutout.

3. The gusset of claim 1, wherein the cutout portion includes a radial portion and a chamfered portion.

4. The gusset of claim 1, wherein each of the first and second portions includes first and second ends, and wherein the first ends are disposed proximate the central portion and the second ends have a point.

5. The gusset of claim 4, further comprising a notch disposed proximate the point.

6. The gusset of claim 1, further comprising edges that are bead blasted.

7. The gusset of claim 1, wherein the first, second and central portions are each composed of grade 50 steel.

8. The gusset of claim 1, wherein the first, second and central portions are each laser cut.

9. A gusset adapted to be coupled to a tool cabinet having a base with at least one wheel that adapted to allow the tool cabinet to be movable and horizontal and vertical front plates coupled to the base, wherein at least one of the vertical and horizontal front plates includes a return flange, the gusset comprising:
    a central portion having opposing external and internal corners;
    first and second substantially flat portions each extending from the central portion, the first portion is adapted to be coupled to the horizontal front plate and the second portion is adapted to be coupled to the vertical front plate; and
    a cutout portion disposed on the internal corner, wherein the cutout portion is adapted to receive stresses caused by a force applied to the first portion relative to the second portion when the tool cabinet is moved, and the cutout portion is adapted to space the gusset at the cutout portion from the return flange.

10. The gusset of claim 9, wherein the cutout portion is a radial cutout.

11. The gusset of claim 9, wherein the cutout portion includes a radial portion and a chamfered portion.

12. The gusset of claim 9, wherein each of the first and second portions includes first and second ends, and wherein the first ends are disposed proximate the central portion and the second ends have a point.

13. The gusset of claim 12, further comprising a notch disposed proximate the point.

14. The gusset of claim 9, further comprising edges that are bead blasted.

15. The gusset of claim 9, wherein the first, second and central portions are each composed of grade 50 steel.

16. The gusset of claim 10, wherein the first, second and central portions are each laser cut.

17. The gusset of claim 10, wherein the first, second and central portions are integral.

18. A tool cabinet, comprising:
    a base with wheels adapted to allow the tool cabinet to be movable;
    horizontal and vertical front plates coupled to the base, wherein at least one of the vertical and horizontal front plates includes a return flange;
    a corner defined by an intersection between the horizontal and vertical front plates; and
    a gusset adapted to reinforce the corner, wherein the gusset includes:
        a central portion having opposing external and internal corners;
        first and second portions each extending from the central portion, the first portion is coupled to the horizontal front plate and the second portion is coupled to the vertical front plate; and
        a cutout portion disposed on the internal corner that spaces the gusset from the return flange at the cutout portion and is adapted to receive stresses applied to the corner due to movement of the tool cabinet.

* * * * *